Sept. 9, 1947.  W. P. FRISCO  2,427,198

CONDUCTORS INSULATED WITH RUBBER COMPOUND LAYERS BONDED TOGETHER

Filed Aug. 18, 1942

INVENTOR
W. P. FRISCO
BY
ATTORNEY

Patented Sept. 9, 1947

2,427,198

UNITED STATES PATENT OFFICE 2,427,198

CONDUCTOR INSULATED WITH RUBBER COMPOUND LAYERS BONDED TOGETHER

William P. Frisco, Dundalk, Md., assignor to Western Electric Company, Incorporated, New York, N. Y., a corporation of New York Application August 18, 1942, Serial No. 455,205

16 Claims. (Cl. 174—120)

This invention relates to the production of composite articles and more particularly to the art of uniting a plurality of layers of rubber compounds to produce composite articles.

Rubber compounds having widely varied properties have been developed for a large number of uses, but there still remain many uses for which no one rubber compound has been produced that is completely satisfactory. For example, in the manufacture of rubber insulated communication conductors to be placed underground, a rubber compound having a low specific inductive capacity is needed to give the maximum electrical performance and, at the same time, a tough elastic rubber covering is required to protect the conductor from injury due to abrasion and chemical corrosion. Generally rubber compounds having a low specific inductive capacity are soft and do not form covers that are resistant to either abrasion or chemical corrosion. Tough elastic rubber covers, on the other hand, usually have a high specific inductive capacity. A composite covering composed of two layers of rubber, which together possess all of the desired properties, may be applied to the conductor in order to provide a high quality insulation. However, much difficulty has been experienced in obtaining a non-porous bond between the rubber compound layers.

Objects of this invention are to provide new and useful composite articles and to provide new and effective methods of and adhesives for uniting surfaces to produce composite articles.

In general the invention comprises applying a film of an ester to a layer of a rubber compound, placing another layer of a rubber compound over the ester film, and subjecting the two layers of rubber compound to heat and pressure to bond them to one another to form a composite article.

Figure 2:
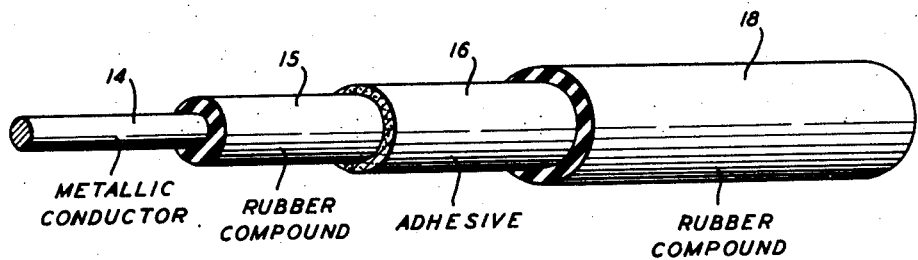
Figure 1:
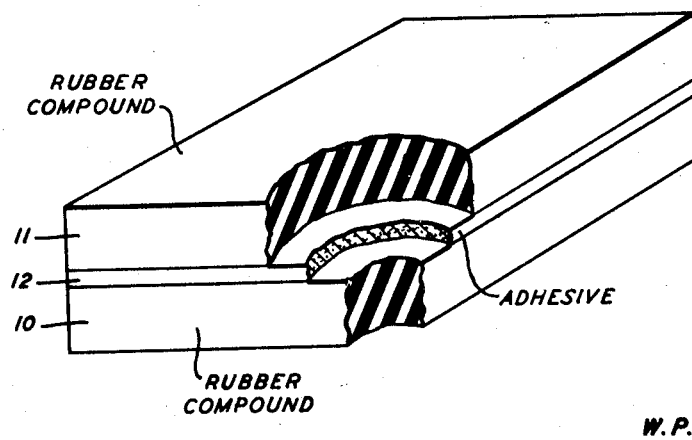

Other objects and features of this invention will become apparent from the following detailed description, when read in conjunction with the accompanying drawings, in which Fig. 1 is a perspective view of a composite article embodying the invention, and Fig. 2 is a perspective view of another composite article embodying the invention.

In the particular embodiment of the invention disclosed in Fig. 1, blocks 10 and 11 are each composed of a rubber compound and are bonded to one another by means of an intervening layer 12 of adhesive, which in accordance with this invention is an ester. To produce the composite article shown in Fig. 1 the layer or block 10 of rubber composition is covered with a thin film of an ester. The block 11 is placed upon the film 12 and the blocks 10 and 11 are subjected to heat and pressure to bond them to one another by means of the intervening ester film 12.

Among the esters which have been found suitable for this purpose are tricresyl phosphate, dibutyl phthalate, ethyl acetate, butyl acetate, ethyl acetoacetate, methyl salicylate, methyl benzoate, triethylene-glycol-di-2-ethyl butyrate, and triethylene-glycol-di-2-ethyl hexoate. This group of esters includes a wide variety of compounds of the type classed as esters. For example, tricresyl phosphate may be considered to be an aryl ester of an inorganic acid; ethyl acetate and butyl acetate are esters of aliphatic, straight-chain organic acids; dibutyl phthalate, methyl salicylate and methyl benzoate are esters of aromatic organic acids; ethyl acetoacetate is a tautomeric, aliphatic acid, one of the tautomeric forms of which is an inner ester; and triethylene-glycol-di-2-ethyl butyrate and triethylene-glycol-di-2-ethyl hexoate are high molecular weight esters of aliphatic acids.

For the purpose of this invention any ester is suitable that will wet both of the surfaces between which a bond is to be formed and which is compatible with the compositions making up said surfaces. The term "compatible esters," as used herein, refers to esters of such a composition that they will not react with or have a deleterious effect upon the rubber compound or compounds with which they are used. The ester film 12 may consist entirely of a single ester or a mixture of esters. Also it may be composed of an ester or a mixture of esters dissolved in or diluted by a suitable solvent or diluent to render it fluid and non-plastic.

It is immaterial whether either or both of the blocks 10 and 11 are unvulcanized, partially vulcanized or completely vulcanized before being bonded to one another in the above manner. While layers of unvulcanized rubber compounds will generally adhere to one another merely by being vulcanized in contact with one another, the use of an ester film as above described between the two layers aids materially in bonding them together. The above described process is not limited to bonding layers of similar rubber compounds to one another, but is also applicable to bonding a layer of one particular rubber compound to a layer of a different rubber compound.

Another specified example of the use of the above described method of bonding rubber compounds to rubber compounds is shown in Fig. 2 of the drawings, wherein an electrical conductor 14 is covered with a layer 15 of an unvulcanized rubber compound having a low specific inductive capacity. The layer 15 is vulcanized upon the conductor 14 and a thin film of an ester of the type above described, and which in this particular embodiment of the invention is dibutyl phthalate, is applied over the layer 15 in any suitable manner. This may conveniently be done by merely saturating a cloth with a suitable liquid ester, or a solution of a solid ester, and wiping the surface of the layer 15 with the cloth. The presentation of the film 16 in Fig. 2 is purely schematic, since the actual thickness of this film is such that, after bonding the two layers together, the juncture of the two layers cannot be distinguished with the naked eye. An outer layer 18 of an unvulcanized rubber compound which is tough, elastic and resistant to chemical corrosion is applied over the ester film 16 and is vulcanized in situ. The heat and pressure required to vulcanize the outer layer 18 simultaneously causes the ester film 16 to bond the outer layer 18 to the inner layer 15.

As pointed out in connection with the description of Fig. 1, the layers 15 and 18 may consist of the same or widely different rubber compositions, and either or both of the layers may be in a vulcanized or unvulcanized form when applied to the conductor. In any case the layers of rubber compound must be subjected to heat and pressure to vulcanize any layer or layers not vulcanized and/or to bond the layers to one another by means of the intervening ester coating.

This invention is applicable wherever it is desired to unite two or more layers of rubber compound. Examples of uses where the invention is applicable in addition to the specific use above described are splicing rubber covered conductors, patching automobile inner tubes or tires, and retreading tires. These and other uses will be apparent to those skilled in the art.

What is claimed is:

1. The method of bonding rubber composition surfaces to each other, which comprises applying to one of such surfaces a film consisting of dibutyl phthalate, placing a second rubber composition surface in contact with the dibutyl phthalate film, and pressing the surfaces together while applying heat thereto.

2. The method of bonding rubber composition surfaces to each other, which comprises applying to one of such surfaces a film consisting of a tricresyl phosphate, placing a second rubber composition surface in contact with the tricresyl phosphate film, and pressing the surfaces together while applying heat thereto.

3. The method of bonding rubber composition surfaces to each other, which comprises applying to one of such surfaces a film consisting of ethyl acetate, placing a second rubber composition surface in contact with the ethyl acetate film, and pressing the surfaces together while applying heat thereto.

4. The method of obtaining a bond between bodies, which comprises applying to a body made of a rubber composition a film whose sole active ingredient is an ester of the group consisting of dibutyl phthalate, tricresyl phosphate, ethyl acetate, butyl acetate, ethyl acetoacetate, methyl salicylate, methyl benzoate, triethylene-glycol-di-2-ethyl butyrate, and triethylene-glycol-di-2-ethyl hexoate, placing a second body made of rubber composition in contact with the ester film, and subjecting the bodies to sufficient heat and pressure to cause the ester film to form a bond therebetween.

5. The method of uniting surfaces, which comprises applying to a vulcanized rubber composition surface a film whose sole active ingredient is an ester of the group consisting of dibutyl phthalate, tricresyl phosphate, ethyl acetate, butyl acetate, ethyl actoacetate, methyl salicylate, methyl benzoate, triethylene-gylcol-di-2-ethyl butyrate, and triethylene-glycol-di-2-ethyl hexoate, placing an unvulcanized rubber composition surface in contact with the ester film, and subjecting the surfaces to heat and pressure to simultaneously vulcanize the unvulcanized rubber composition surface and bond the two surfaces to one another.

6. The method of covering an article, which comprises covering an article with a layer of a rubber compound, applying to the rubber compound layer a film whose sole active ingredient is an ester of the group consisting of dibutyl phthalate, tricresyl phosphate, ethyl acetate, butyl acetate, ethyl acetoacetate, methyl salicylate, methyl benzoate, triethylene-glycol-di-2-ethyl butyrate, and triethylene-glycol-di-2-ethyl hexoate, covering the ester coated layer of rubber compound with a second layer of a rubber compound, and subjecting the covered article to heat and pressure to bond the two layers together.

7. The method of producing an insulated conductor which comprises covering a metallic conductor with a layer of a vulcanized rubber compound, applying to the rubber layer a film whose sole active ingredient is an ester of the group consisting of dibutyl phthalate, tricresyl phosphate, ethyl acetate, butyl acetate, ethyl acetoacetate, methyl salicylate, methyl benzoate, triethylene-glycol-di-2-ethyl butyrate, and triethylene-glycol-di-2-ethyl hexoate, applying over the ester film a layer of an unvulcanized rubber compound differing in composition from the layer of vulcanized rubber compound, and vulcanizing the unvulcanized rubber compound layer.

8. A composite article, which comprises a plurality of bodies of rubber compound bonded together by a film consisting of an ester of the group consisting of dibutyl phthalate, tricresyl phosphate, ethyl acetate, butyl acetate, ethyl acetoacetate, methyl salicylate, methyl benzoate, triethylene-glycol-di-2-ethyl butyrate, and triethylene-glycol-di-2-ethyl hexoate positioned between the two bodies.

9. A covered article, which comprises a base member, a layer of a rubber compound adjacent to the base member, and a second layer of a rubber compound adjacent to the first mentioned layer and bonded thereto by means of a film consisting of an ester of the group consisting of dibutyl phthalate, tricresyl phosphate, ethyl acetate, butyl acetate, ethyl acetoacetate, methyl salicylate, methyl benzoate, triethylene-glycol-di-2-ethyl butyrate, and triethylene-glycol-di-2-ethyl hexoate.

10. A composite article, which comprises a surface composed of a vulcanized rubber compound, a film consisting of an ester of the group consisting of dibutyl phthalate, tricresyl phosphate, ethyl acetate, butyl acetate, ethyl acetoacetate, methyl salicylate, methyl benzoate, triethylene-glycol-di-2-ethyl butyrate, and triethylene-glycol-di-2-ethyl hexoate covering said surface, and a second surface of a vulcanized rubber composition in contact with the ester film, said ester film having been applied between said surfaces prior to the vulcanization of one of the surfaces in order to bond the two surfaces to one another.

11. A covered article, which comprises a base member, a layer of a rubber compound adjacent to the base member, and a second layer of a rubber compound adjacent to the first-mentioned layer and bonded thereto by means of a film consisting of an ester of the group consisting of dibutyl phthalate, tricresyl phosphate, ethyl acetate, butyl acetate, ethyl acetoacetate, methyl salicylate, methyl benzoate, triethylene-glycol-di-2-ethyl butyrate, and triethylene-glycol-di-2- ethyl hexoate, said ester film having been applied between said layers prior to the vulcanization of one of the layers in order to bond the two layers to one another.

12. An insulated conductor, which comprises a metallic conductor, a layer of a vulcanized rubber compound surrounding the conductor, a film consisting of an ester of the group consisting of dibutyl phthalate, tricresyl phosphate, ethyl acetate, butyl acetate, ethyl acetoacetate, methyl salicylate, methyl benzoate, triethylene-glycol-di-2-ethyl butyrate, and triethylene-glycol-di-2-ethyl hexoate covering the layer of vulcanized rubber compound, and a second layer of vulcanized rubber compound surrounding the ester film, said ester film having been applied between said layers of rubber compositions prior to the vulcanization of one of said layers in order to bond the two layers to one another.

13. An insulated conductor, which comprises a metallic conductor, a layer of a vulcanized rubber compound surrounding the conductor, a film consisting of an ester of the group consisting of dibutyl phthalate, tricresyl phosphate, ethyl acetate, butyl acetate, ethyl acetoacetate, methyl salicylate, methyl benzoate, triethylene-glycol-di-2-ethyl butyrate, and triethylene-glycol-di-2-ethyl hexoate covering the vulcanized rubber compound layer, and a layer of a vulcanized rubber compound differing in composition from the first-mentioned rubber compound surrounding the ester film, said ester film having been applied between said layers of rubber compositions prior to the vulcanization of one of said layers in order to bond the two layers to one another.

14. The method of making insulated conductors, which comprises covering a metallic conductor with a layer of rubber composition, vulcanizing the layer, coating the vulcanized layer with a thin film consisting of tricresyl phosphate, applying a second layer of rubber composition over the film, and vulcanizing the latter layer, whereby the two rubber composition layers are bonded to one another.

15. The method of making insulated conductors, which comprises covering a metallic conductor with a layer of rubber composition, vulcanizing the layer, coating the vulcanized layer with a thin film consisting of ethyl acetate, applying a second layer of rubber composition over the film, and vulcanizing the latter layer, whereby the two rubber composition layers are bonded to one another.

16. The method of making insulated conductors, which comprises covering a metallic conductor with a layer of rubber composition, vulcanizing the layer, coating the vulcanized layer with a thin film consisting of dibutyl phthalate, applying a second layer of rubber composition over the film and vulcanizing the latter layer, whereby the two rubber composition layers are bonded to one another.

WILLIAM P. FRISCO.

REFERENCES CITED

The following references are of record in the file of this patent:

UNITED STATES PATENTS

| Number | Name | Date |
|---|---|---|
| 2,147,620 | Winkelmann | Feb. 14, 1939 |
| 2,067,405 | Mayne | Jan. 12, 1937 |

OTHER REFERENCES

Lee, The India Rubber Journal, May 31, 1930, pp. 784–786.

Transactions, Institution of the Rubber Industry, August 1937, vol. 13, page 150.